(12) United States Patent
Zaitsev

(10) Patent No.: US 7,917,954 B1
(45) Date of Patent: Mar. 29, 2011

(54) SYSTEMS AND METHODS FOR POLICY-BASED PROGRAM CONFIGURATION

(75) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 12/892,678

(22) Filed: Sep. 28, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl. .............................. 726/23; 726/25; 726/34

(58) Field of Classification Search .................... 726/22, 726/23, 25, 34
See application file for complete search history.

(56) References Cited

U.S. PATENT DOCUMENTS

| | | | |
|---|---|---|---|
| 5,919,244 A | 7/1999 | Danz et al. | |
| 6,459,682 B1* | 10/2002 | Ellesson et al. | 370/235 |
| 6,856,951 B2* | 2/2005 | Moona et al. | 703/22 |
| 6,996,517 B1* | 2/2006 | Papaefstathiou | 703/22 |
| 7,054,846 B1 | 5/2006 | Adamy et al. | |
| 7,089,172 B2 | 8/2006 | Lines et al. | |
| 7,225,250 B1 | 5/2007 | Harrop | |
| 7,409,593 B2* | 8/2008 | Aaron | 714/26 |
| 7,478,223 B2 | 1/2009 | Sikdar et al. | |
| 7,500,158 B1* | 3/2009 | Smith et al. | 714/708 |
| 7,581,224 B2 | 8/2009 | Romero | |
| 2002/0049608 A1* | 4/2002 | Hartsell et al. | 705/1 |
| 2002/0049841 A1* | 4/2002 | Johnson et al. | 709/225 |
| 2002/0059274 A1* | 5/2002 | Hartsell et al. | 707/100 |
| 2002/0095400 A1* | 7/2002 | Johnson et al. | 707/1 |
| 2002/0120741 A1* | 8/2002 | Webb et al. | 709/225 |
| 2002/0144259 A1 | 10/2002 | Gutta et al. | |
| 2002/0152305 A1* | 10/2002 | Jackson et al. | 709/224 |
| 2002/0194251 A1* | 12/2002 | Richter et al. | 709/105 |
| 2004/0243699 A1* | 12/2004 | Koclanes et al. | 709/224 |
| 2005/0015667 A1* | 1/2005 | Aaron | 714/25 |
| 2005/0091657 A1 | 4/2005 | Priem | |
| 2005/0096877 A1 | 5/2005 | Shimazaki et al. | |
| 2007/0005545 A1 | 1/2007 | Maddox | |
| 2007/0189611 A1* | 8/2007 | Yang et al. | 382/228 |
| 2007/0300174 A1 | 12/2007 | Macbeth et al. | |
| 2008/0209016 A1 | 8/2008 | Karve et al. | |
| 2008/0320123 A1* | 12/2008 | Houlihan et al. | 709/224 |
| 2009/0204692 A1* | 8/2009 | Smith et al. | 709/221 |
| 2010/0070319 A1* | 3/2010 | Prafullchandra et al. | 705/7 |

FOREIGN PATENT DOCUMENTS

| | | |
|---|---|---|
| JP | 03-129442 A | 6/1991 |
| JP | 10-143400 A | 5/1998 |
| JP | 16-118628 A | 4/2004 |
| WO | 2004102315 A2 | 11/2004 |
| WO | 2009006564 A2 | 1/2009 |

* cited by examiner

*Primary Examiner* — David Garcia Cervetti
(74) *Attorney, Agent, or Firm* — Arent Fox LLP; Michael Fainberg

(57) ABSTRACT

Disclosed are systems, methods and computer program products for adaptive polity-based configuration of programs. An example method comprises collecting from a computer system configuration and performance information, rating system performance based on the collected information and classifying the computer system based on its performance rating. The method further includes selecting based on the system classification an operational policy for a computer program. Each policy specifies different program settings and different limits of system resource utilization by the program for each class of computer systems. The method further includes monitoring system resource utilization during program execution to determine whether system resource utilization exceeds the limit specified in the selected operational policy. If the system resource utilization exceeds the specified limit, the method selects another policy specifying different program settings and a different limit of system resource utilization.

20 Claims, 6 Drawing Sheets

| Table of Policies for an Application 110A | | |
|---|---|---|
| Policy | Program Settings | Resource Utilization |
| Policy 1 | Settings 111A | $CPU_1/RAM_1/HDD_1/NET_1$ |
| Policy 2 | Settings 112A | $CPU_2/RAM_2/HDD_2/NET_2$ |
| Policy 3 | Settings 113A | $CPU_3/RAM_3/HDD_3/NET_3$ |
| Policy 4 | Settings 114A | $CPU_4/RAM_4/HDD_4/NET_4$ |
| ... | ... | ... |

Fig. 4

| Computer Class | Policy 1 | Policy 2 | Policy 3 | Policy 4 |
|---|---|---|---|---|
| Thin Client Computer | X | | | |
| Notebook Computer | X | X | | |
| Thick Client Computer | X | X | | |
| Gaming Computer | X | X | X | |
| Network Server | X | X | X | X |

Fig. 5

SYSTEMS AND METHODS FOR POLICY-BASED PROGRAM CONFIGURATION

CROSS-REFERENCE TO RELATED APPLICATIONS

This application claims benefit of priority under 35 U.S.C. 119(a) to a Russian Patent Application No. 2010119565 filed on May 18, 2010, which is incorporated by reference herein.

1. Technical Field

The present disclosure relates generally to the field of computer science and, in particular, to systems, methods and computer program products for adaptive policy-based program configuration for improving computer performance and resource utilization.

2. Background

Generally, modern computer applications are very resource intensive because they interact extensively with hardware and software components of computer systems on which they run. Despite the fact that developers constantly improve operation of these applications and their interaction with computer systems, the demand for system resources continues to grow steadily as the complexity of these applications increases. An example of resource-demanding applications is antivirus applications. Antivirus applications interact extensively with system's software and hardware components during system scans for malicious software, such as viruses, worms, spyware and other types of malware that threatens security of the computer system.

Some computer applications, including many antivirus applications, allow user to adjust various application settings in order to control execution of program tasks. These changes to the application settings may affect system resource utilization, including processor, memory, hard drive and network utilization. In some instances, changes to the application settings may overload the computer system and impair its performance. Accordingly, there is a need for a technique for assessing effects of different program settings on a computer system and for dynamically adjusting program settings in order to improve system resource utilization.

SUMMARY

Disclosed herein are systems, methods and computer program products for adaptive policy-based program configuration. In one example embodiment, a method comprises collecting from a computer system configuration and performance information for one or more computer system components, including hardware and software components. The method further includes rating performance of the components of the computer system based on the collected configuration and performance information. The performance rating of the component may be computed as a function of the component's performance characteristic and one or more technical characteristics. The component's performance rating may be adjusted by a weighting coefficient to account for the relative costs between different components of the computer system, interoperability between different system components, or effect of the computer's operating system on the performance of system components. The method further includes computing an overall performance rating of the computer system by, for example, applying fuzzy logic rules to the performance ratings of the individual system components.

The method further comprises classifying the computer system-based on the overall system performance rating. Different classes of computer systems have different performance characteristics. The method further includes selecting based on the system classification one of a plurality of predefined operational policies for a program to be executed on the computer system. Each predefined operational polyicy specifies different program settings and different limits of system resource utilization by the program for each class of computer systems. The method further includes monitoring system resource utilization by the program being executed on the computer system to determine whether system resource utilization exceeds the limit specified in the selected operational policy. If the system resource utilization exceeds the specified limit, the method selects another policy specifying different program settings and a different limit of system resource utilization. If the system resource utilization exceeds the limits specified in all predefined operational policies, the method creates in real-time a custom operational policy for the program. The custom policy specifies different program settings that minimize resource utilization on the computer system.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings:

FIG. 4 illustrates a data structure for storing policy information in accordance with one example embodiment.

FIG. 5 illustrates a data structure for storing policy information in accordance with another example embodiment.

DETAILED DESCRIPTION OF EXAMPLE EMBODIMENTS

Example embodiments are described herein in the context of systems, methods and computer program products for adaptive policy-based program configuration. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
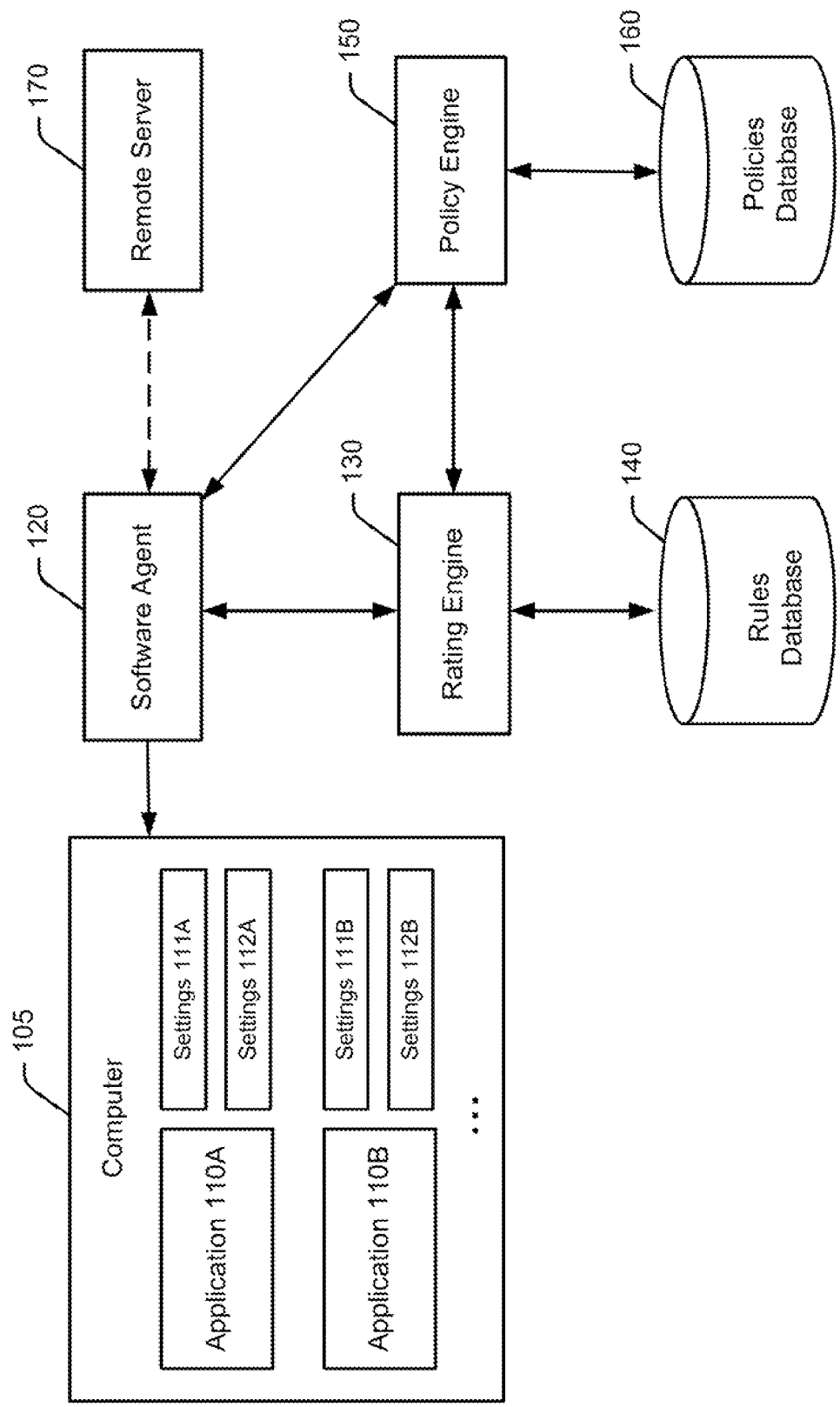
FIG. 1 illustrates a schematic block diagram of a system for adaptive policy-based program configuration in accordance with one example embodiment.

FIG. 1 illustrates a schematic block diagram of a system for adaptive policy-based program configuration in accordance with one example embodiment. System 100 includes one or more computers 105, each having a plurality of applications 110 and associates settings 111, 112, etc. Computer 105 may be a home PC, a notebook, a thin or thick client office computer, a gaming PC, an application server or other type of programmable machine. Computers 105 may be connected into a local area network (not shown). Applications 110 may include computer programs, scripts, codes, plug-ins and other types of computer-executable instructions. In one example embodiment, application 110A includes an antivirus program. Program settings 111, 112, etc. are used to control operation of applications 110. In case of an antivirus program, program settings include malware scanning settings, such as day/time setting indicating start of malware scan, scan duration setting, hardware scan settings, software scan settings and other.

In one example embodiment, system 100 further includes one or more local software agents 120. Software agent 120 may be implemented as a stand-alone program, as a script or other type of executable, compilable or interpretable instructions. Software agents 120 may be directly deployed on computers 110 or other network devices connected via network to computers 105. Software agents 120 performs the following functions: collecting system configuration information from computers 105, monitoring system resource utilization during execution of applications 110 on computers 105, and adjusting program setting 111, 112, etc. in order to improve system resource utilization and overall performance of computer(s) 105.

In one example embodiment, system 100 also includes a rating engine 130 and a rating database 140. Rating engine 130 and database 140 may reside on a separate network device, such as a local or remote application server. Alternatively, rating engine 130 and database 140 may be deployed on the same system or the same network as software agent 120. In one example embodiment, rating engine 130 performs the following functions: deploying software agent 120 on computer(s) 105, receiving computer configuration and resource utilization information from the software agent, rating performance of computer(s) 105, classifying the computer(s) 105 based on its performance rating. In one example embodiment, database 140 contains fuzzy logic rules for determining performance rating of computer(s) 105.

In one example embodiment, system 100 also includes a policy engine 150 and policy database 160. Policy engine 150 and database 160 may reside on a separate network device, such as a local or remote application server. Alternatively, policy engine 150 and database 160 may be deployed on the same system or the same network as software agent 120. In one example embodiment, policy engine 150 performs the following functions: maintaining predefined computer classifications, maintaining predefine operational policies specifying program settings for applications 110, and generating custom operational policies for computer(s) 105. In one example embodiment, database 160 contains predefined operational policies for applications 110 for various computer classes, as well as custom policies.

In one example embodiment, system 100 may further include a remote server 170 hosted by a provider of the policy-based configuration service. Remote server 170 provides software upgrades as well as updated information about new software and hardware components, fuzzy logic rules, computer classifications, operational policy definitions and other information. It should be noted that depicted system configuration is not limiting, other software and hardware components as well as databases may be used in various embodiments.

In one example embodiment, software agent 120 may be configured to auto start upon boot-up of computer 105. Alternatively, agent 120 may be activated by the computer user, system administrator, rating engine 130, policy engine 150 or one of the applications 110, such as an antivirus application. Once activated, agent 120 begins collecting from computer(s) 105 system configuration information, including hardware and software information. Hardware configuration information may include, but is not limited to information about CPU, operating memory, hard disk drive(s) and network interfaces. The software configuration information may include, but is not limited to the information about operating system, software applications, programs, scripts and processes running on computer(s) 105. Software agent 120 may also collect other system information, such as registry data, that indicates which applications, programs and processes are running on computer 105. Software agent 120 then forwards the collected system configuration information to rating engine 130 and policy engine 150.

Figure 2:
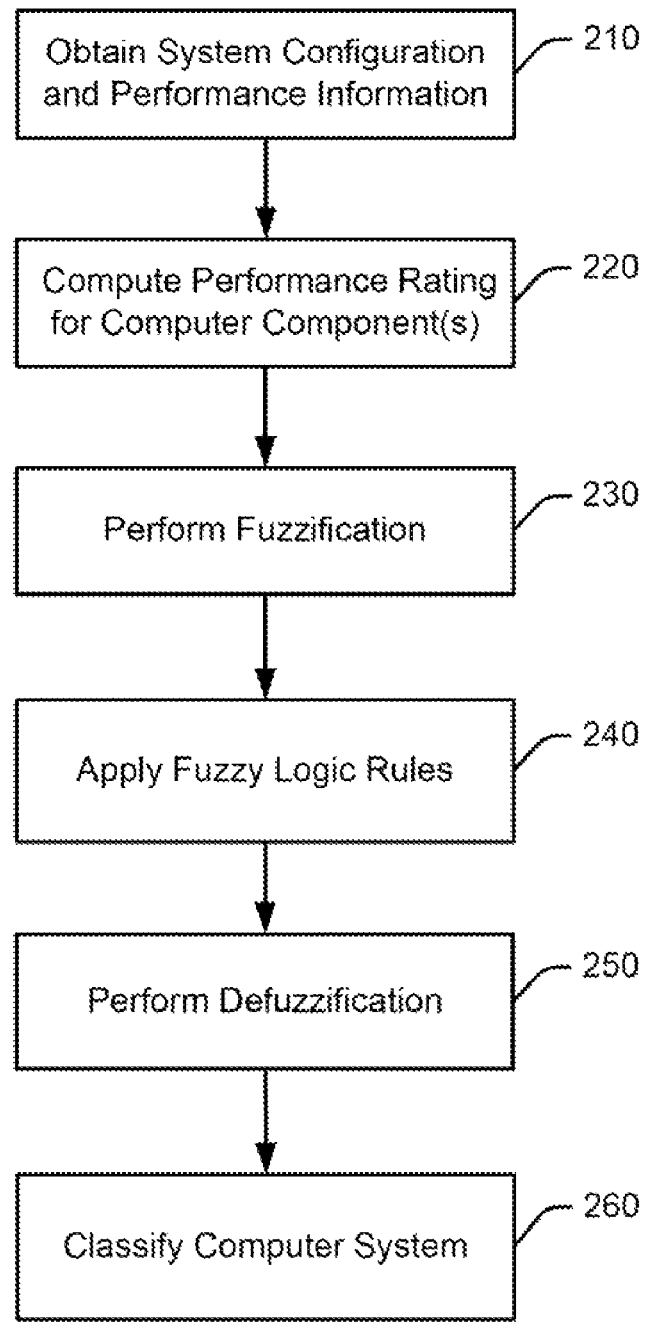
FIG. 2 illustrates a methodology for adaptive policy-based program configuration in accordance with one example embodiment.

In one example embodiment, performance rating engine 130 conducts performance analysis and rating of computer(s) 105. FIG. 2 illustrates an example performance rating algorithm implemented by rating engine 130. As shown, at step 210, rating engine 130 obtains from software agent 120 configuration information about computer(s) 105, such as information about computer's CPU, operating memory, hard disk drive (HDD), network interface(s) and operating system (OS). CPU information may include, for example, number of processor cores, operational frequency, processor architecture, and its performance statistics. Information about operating memory may include RAM's size and bandwidth. Information about hard disk drive may also include its size and bandwidth. Network information may include its type, e.g., wired or wireless, and actual bandwidth. Performance of each system component, such as its actual bandwidth, may be measured by a benchmark and diagnostic utility, such as HD Tune, PCMark Vantage, 3DMark Vantage or other system analysis software utilized by engine 130.

To rate overall system performance, at step 220, rating engine 130 computes individual performance ratings for components of computer(s) 105. Generally, the higher are the technical characteristics and performance of a system components, the higher is its performance rating. For some system components, rating engine 130 may use only one technical characteristic to rate performance of component of computer(s) 105. For example, operating memory's performance may be rated based only on its size, which is measured in Megabytes. Network interface's performance may be rated based on its actual bandwidth, which is measured in Megabits per second. For other system components, rating engine 130 may compute performance rating as a function of several different technical characteristics. For example, CPU's performance may be rated as a function of a coefficient of the number of its cores multiplied by its operating frequency and further multiplied by a coefficient of its architecture. HDD's performance may be rated as a function of its size multiplied by a coefficient of its actual measured bandwidth. Other functions and coefficients may be used in various embodiments.

It should be noted that performance ratings of individual system components are highly relative and depend on various factors selected by rating engine 130. In one example embodiment, rating engine 130 may account for relative "cost" of tone system component with respect to other system components. For example, CPU time may have lover "cost" because modern multi-core processors with high operating frequencies (several Gigahertz) perform resource-intensive computational operations very fast, but access time to a hard disk drive, which provides data to the CPU, may have a much higher "cost" because HDDs usually have much smaller bandwidth (several Megabytes, per second). This may cause processor-memory bottleneck during execution of certain tasks by applications 110 that impairs overall system performance. In another example, rating engine 130 may also account for known or likely interoperability problems between various system components that may affect overall system performance. Yet in another example, rating engine 130 may also account for affects of operating system on the overall system performance, because different operating systems control system resource allocation differently. To account for the effects of these and other factors, rating engine 130 may applying various weighting coefficients to the performance ratings of individual system components and/or to the overall performance rating of computer 105.

As indicated above, based on the weighted performance ratings of individual system components, rating engine 130 may compute an overall system performance rating for computer(s) 105. In one example embodiment, overall system performance rating may be expressed as a string of weighted performance rating coefficients of individual system components, which can be expressed in the following format: CPU/RAM/HDD/Network. For example, for a computer having the following technical characteristics: Pentium 4 3 Ghz/512 Mb/500 GB 7200RPM/10 Mbit/s, the overall system performance rating may be expressed as follows: 3000/512/65000/10000. In this overall system performance rating, CPU performance rating coefficient 3000 represents Pentium 4 3 Ghz; RAM performance rating coefficient 512 represents 512 Mb of memory; HDD performance rating coefficient 65000 represents a 500 GB hard disk drive (this rating has been weighted by a coefficient of 1.3 to account for lower "cost" of data access time due to high RPM of this hard disk drive); and network performance rating coefficient 10000 represents 10 Mb/s Ethernet. In another example, for a computer having the following configuration: Core i7 2.66 Ghz/4096 MB/SSD 160 GB/30 Mbit/sec, the overall system performance rating may be expressed as follows: 10000/4096/200000/30000. In this overall system performance rating, CPU performance rating coefficient 10000 represents 2.66 Gz Core i7 processor (this rating was weighted by coefficient of 3.5 account for multi-core and hyper-threading technologies utilized in this processor, which significantly increases its performance); RAM performance rating coefficient 4096 represents 4096 MB of RAM; HDD performance rating 200000 represents 160 GB HDD (this rating was weighted by a coefficient of 12.5 to account for very low "cost" of access time to the data stored on a solid-state drive); network rating 30000 represents 10 Mbit/sec optical network interface.

With reference to FIG. 2, at steps 230-250, rating engine 130 may use fuzzy logic to determine overall system performance rating based on performance ratings of individual system components in accordance with one example embodiment. In particular, at step 230, rating engine 130 performs fuzzification—translation of non-fuzzy quantitative performance rating(s) of individual components CPU/RAM/HDD/Network to fuzzy logic linguistic variables. For example, linguist variable for individual component performance rating may have five associated linguistic values, such as "very low", "low", "average", "high", and "very high".

Next, at step 240, rating engine 130 applies fuzzy logic rules to the linguistic values of performance ratings of individual system components. These rules are stored in database 140 and frequently updated to account for newly developed and commercially available computer components. In one embodiment, rating engine 130 may apply component-specific fuzzy logic rules to determine a fuzzy logic values for the overall system performance rating variable. The fuzzy logic rules may have an IF-THEN format. For example, component-specific fuzzy logic rules may state "IF processor rating is high THEN overall system performance rating is high" or "IF operating memory is very low THEN overall system performance rating is very low". In another embodiment, rating engine 130 may apply composite fuzzy logic rules that account for several different performance ratings. For example, composite fuzzy logic rules may state "IF processor rating is very high AND operating memory is high AND hard disk drive rating is high AND network rating is medium THEN overall system performance rating is high" or "IF processor rating is very high AND operating memory is medium AND hard disk drive rating is high AND network rating is high THEN overall system performance rating is medium". Therefore, the fuzzy logic rules provide fuzzy logic values, such as "very low", "low", "average", "high", and "very high", for the overall system performance rating variable.

Next, at step 250, rating engine 130 performs defuzzification—translation of fuzzy logic linguistic values to non-fuzzy quantitative values, which represent the overall system performance rating(s) for computer(s) 105. The complex process of calculating the output value takes into account what fuzzy logic rules were applied at step 240, what degree of affiliation between performance ratings of individual system components and other criteria known in the art. In one example embodiment, rating engine 130 may apply Mamdani and Sugeno fuzzy logic algorithms along with centroid defuzzification techniques. It should be noted that other known defuzzification algorithms and techniques may be used in alternative embodiments to calculate the overall system performance rating(s) for computer(s) 105.

Finally, at step 260, rating engine 130 classifies computer(s) 105 into one of several predefined computer classes based on overall performance rating of each computer 105. The computer classification may include, but is not limited to the following classes of computer systems: thin client computer, notebook computer, thick client computer, gaming computer and network server. In particular, rating engine 130 may classify computers having very low performance rating of 1000, such as thick client computers, weak office PCs, tablet computers, netbooks, PDAs, mobile phones, as thin client computers. Computers having low performance rating of 2000 may be classified as notebook computers. Computers having medium performance rating of 3000, such as thick client computer and home or office PCs, may be classified as thick client computers. Computers having high performance rating of 4000 may be classified as powerful gaming PCs. Computers having very high performance rating 5000 may be classified as powerful network servers. It should be noted that this classification is not limiting and fewer or more classes of computer systems may be created in alternative embodiments to allow greater or lower degree of granularity of system classifications.

Figure 3:
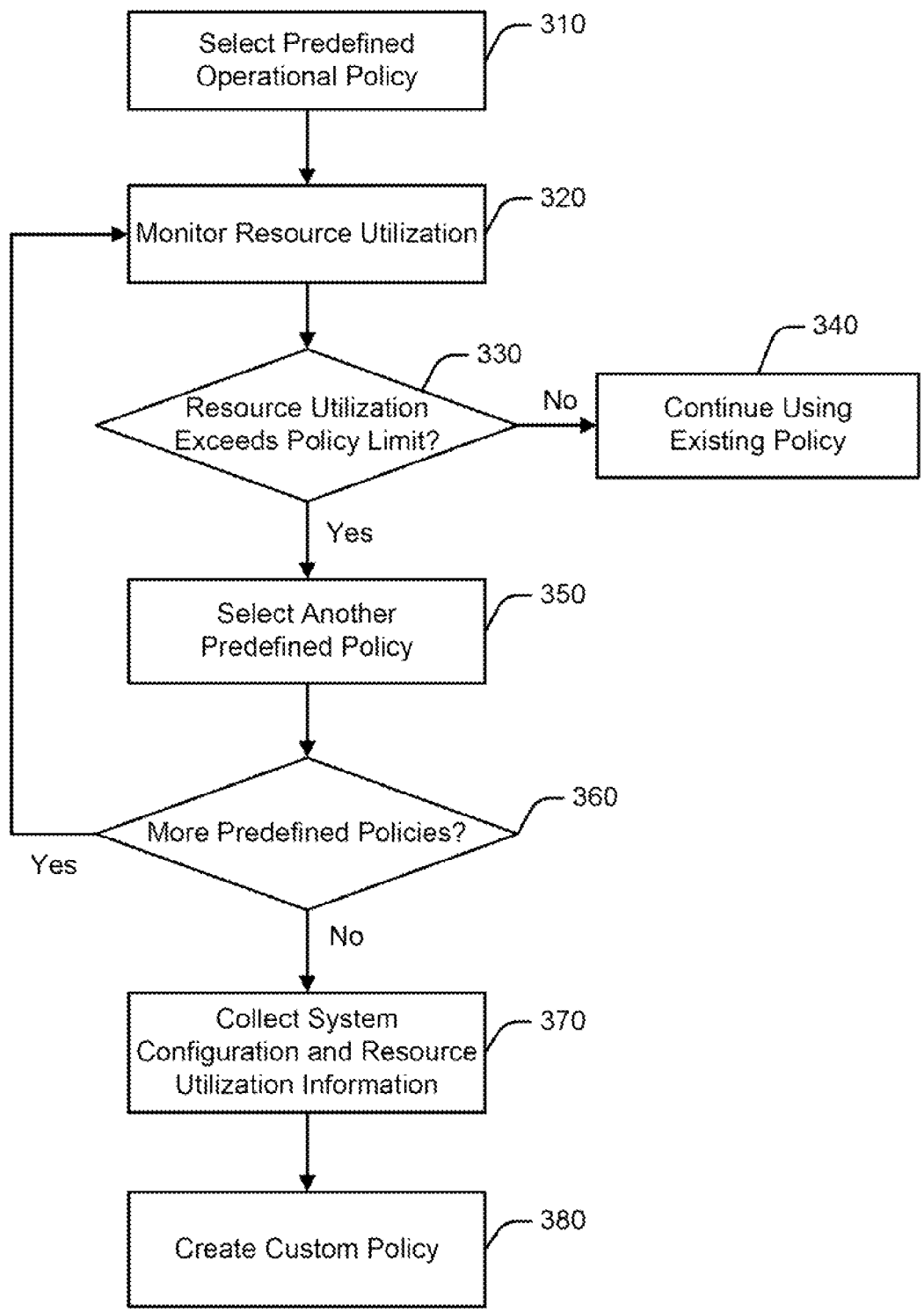
FIG. 3 illustrates a methodology for adaptive policy-based program configuration in accordance with another example embodiment.

Once computer(s) 105 have been classified, rating engine 130 may pass computer classification information to policy engine 150, which may select an appropriate operational policy for application(s) 110. FIG. 3 illustrates an example policy selection algorithm implemented by policy engine 150. As shown, at step 310, policy engine 150 selects an operation policy for application(s) 110 from a set of predefined operational policies. Policies specify program settings 111, 112, etc. that optimize performance of computers(s) 105 by liming system resource utilization by applications 110. Relationship between program settings and system resource utilization may be illustrated in the following example of an antivirus program. For example, activation of HIPS (Host-Based Intrusion Prevention System) settings of antivirus program 110A significantly loads processor of computer 105, while full antivirus scan of a hard disk drive significantly loads computer's disk system. Therefore, in the first case, processor utilization will be significantly increased and in the second case, had disk drive utilization will be increased. Accordingly, to optimize performance of the computer system on which antivirus program executes, policy engine 150 may control settings of the antivirus program using different operational policies that limit system resource utilization by the antivirus program, while assuring maximum possible antivirus protection of the computers system 105.

FIG. 4 depicts an example embodiment of a policy table 400 for application 110A, such as an antivirus application. Different applications will have different policy tables. Table 400 includes several different policies specifying different program settings and limits of system resource utilization by application 110A. For example, antivirus program settings may include, but not limited to, day/time setting indicating start of malware scan by the antivirus program 110A, duration of the scan settings, hardware scan settings, and software scan settings. System resource utilization limits may be represented in the following format: $CPU_1/RAM_1/HDD_1/NET_1$, where parameter $CPU_1$ represents limit of processor utilization, $RAM_1$ represents limit of operating memory utilization, $HDD_1$ represents limit of hard disk drive utilization, and $NET_1$ represents limit of network utilization by application 110A. Limits of system resource utilization for different policies may be expressed as percentages of total resource utilization. For example, policy 1 may specify that system resource utilization limits are 20%/15%/20%/25%. Policy 2 may specify that system resource utilization limits are 35%/25%/25%/30%. Policy 3 may specify that resource utilization limits are 55%/50%/45%/55%. Therefore, operational policy 3 is more intensive policy than operation policy 2, and policy 1 is the most relaxed policy, because it results in light resource utilization.

In one example embodiment, different operational policies may apply to different classes of computers. FIG. 5 depicts another example embodiment of a policy table 500 for application 110A, such as an antivirus application. As shown, table 500 includes four different policies associated with different classes of computers. As described in example above, operational policy 1 imposes light load on computer 105 (e.g., resource utilization 20%/15%/20%/25%), because only a few basic functions of the antivirus program are activated under this policy with negligible effect on system performance. At the other end of the spectrum, policy 4 imposes the heaviest load on computer 105 (e.g., resource utilization 65%/75%/70%/65%), because all functions of the antivirus program may be activated under this policy with a significant effect on system performance. However, as noted above, different classes of computer systems have different performance characteristics and handle different processing loads. For example, weaker computer systems, such as thin client computers and notebook computers, may only support light processing loads specified by polices 1 and 2, while more powerful computer systems, such as gaming PCs and network servers, may support much higher processing loads specified by policies 3 and 4. Accordingly, having classified computer (s) 105 into different performance classes, as shown in table 500, policy engine 150 may select the most suitable operational policy for applications 110 running on computer(s) 105.

In one example embodiment, policy engine 150 is configured to automatically select the most stringent operational policy for the system class with which computer 105 is associated in order to maximize the number of tasks performed by the application(s) 110. In case of antivirus application, the most stringent operation policy provides the most thorough antivirus scan of the entire computer 105, which results in the highest level of system protection against viruses. In another example embodiment, policy engine 150 may utilize fuzzy logic to select the most appropriate operational policy for application(s) 110. In particular, fuzzy logic rules may be used to assess the tasks performed by the application and their effect on system performance, and to select appropriate program settings that would not overload computer(s) 105.

Again with reference to FIG. 3, once the appropriate policy has been selected for application 110 running on computer 105, policy engine 150 instructs software agent 120, at step 320, to apply the selected policy to the application 110 and begin to monitor system resource utilization by application 110 to assure that resource utilization is within limits specified by the selected policy. If at step 330, software agent 120 determines that system resource utilization does not exceed the limit specified in the selected policy, at step 340, it continues to execute the existing policy. However, if system resource utilization begins to exceed the specified limits, software agent 120 may instruct policy engine 150 to select another predefined policy at step 350. Thus, if policy 3 was originally selected, policy engine 150 may provide policy 2, which has less intensive system utilization requirements and in which some functions of the software may be deactivated or performed during different time, so as to decrease load on computer system 105. In case of the antivirus application, a new policy may limit antivirus scan to certain sectors of hard disk drive, therefore limiting load on that system component. In addition, the new policy may specify that certain antivirus scans must be performed during off hours, such as at night, when this scan does not interfere with activities of system users during the day.

Having selected a new policy for application 110, software agent 120 continues to monitor system resource utilization by the application, and, if it determines that system resource utilization does not exceed the new limit specified in the selected policy, it continues to execute the new policy. However, if system resource utilization begins to exceed the specified limits again, software agent 120 may instruct policy engine 150 to select another predefined policy. If at step 360, it is determined that no more predefined policies are available for the computer class within which computer 105 was assigned, software agent 120 may collect all available system configuration and resource utilization information about computer 105 and forward it to policy engine 150. Policy engine 105 in turn uses the collected information to create a custom policy for application 110, such as an antivirus program. In one example embodiment, policy engine 150 may contact remote server 170 to request administrator's assistance in generation of custom operational policies for application 110, which will improve system performance.

Figure 6:
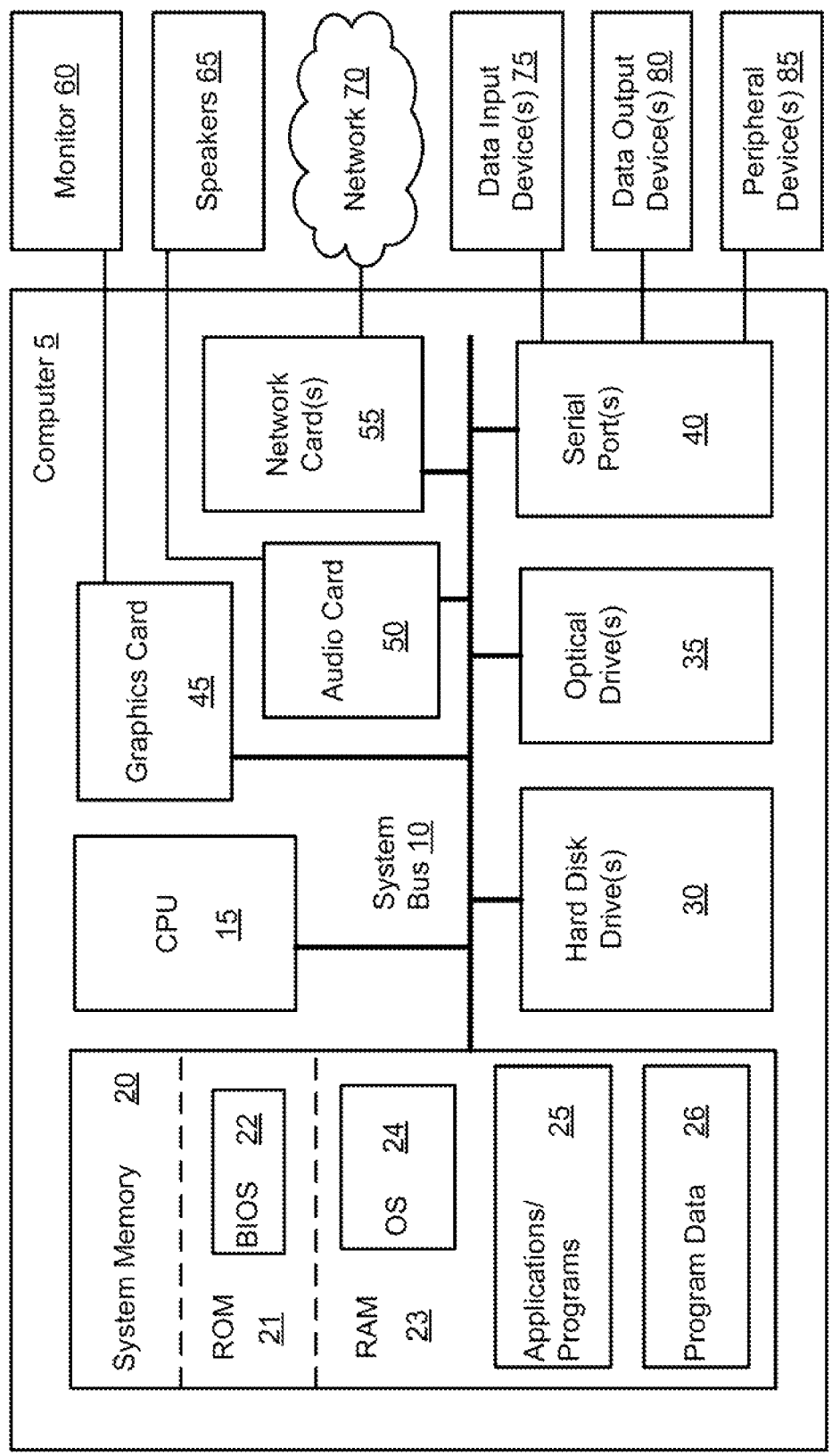
FIG. 6 illustrates a schematic block diagram of a computer system in accordance with one example embodiment.

FIG. 6 depicts an exemplary computer system 5, which can be used to implement computer 105, in accordance with one example embodiment. It should be noted that computer system 5 may also be used to implement a desktop computer, a workstation, a laptop computer, an application server or other type of data processing device. As depicted, computer system 5 includes CPU 15, system memory 20, hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. CPU 15 may include Intel® Core 2 Quad 2.33 GHz processor or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® Vista® or other type of OS, that is responsible for management and coordination of processes and allocation and sharing of hardware resources in computer system 5. System memory 20 also stores applications and programs 25 that are currently running on the computer 5, including an antivirus application and various other programs. System memory 20 also stores various runtime data 26 used by the applications and programs 25.

Computer system 5 may further include hard disk drive(s) 30, such as 500 GB SATA magnetic hard drive, and optical disk drive(s) 35 for reading from or writing to a removable optical disk, such as a CD-ROM, DVD-ROM or other optical media. Drives 30 and 25 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer system 5 may also include graphics card 45, such as nVidia® GeForce® GT 240 M or other video card, for interfacing with a monitor 60 or other video reproduction device. Computer system 5 may also include an audio card 50 for reproducing sound via internal or external speakers 65. In addition, computer system 5 may include network card(s)55, such as Ethernet, WiFi, GSM, Bluetooth or other wired, wireless, or cellular network interface for connecting computer system 5 to network 70, such as the Internet.

As used in this application, the terms "system," "component," "agent" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various non-transitory computer-readable medium having various data structures stored thereon. The components may communicate by way of local and/or remote processes such as in accordance with a signal having one or more data packets, such as data from one component interacting with another component in a local system and/or across a network, such as the Internet with other systems.

In various embodiments, the algorithms and methods described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for adaptive policy-based program configuration, the method comprises:
   collecting from a computer system configuration and performance information for one or more computer system components;
   rating performance of the computer system based on the collected information;
   classifying the computer system based on the system's performance rating, wherein different predefined classes of computer systems have different performance characteristics;
   selecting based on the system classification one of a plurality of predefined operational policies for a computer program to be executed on the computer system, wherein each predefined operational policy specifies different program settings and different limits of system resource utilization by the computer program for each class of computer systems;
   monitoring system resource utilization by the computer program being executed on the computer system to determine whether system resource utilization exceeds the limit specified in the selected operational policy; and
   if the system resource utilization exceeds the specified limit, selecting for the computer program another predefined operational policy specifying different program settings and a different limit of system resource utilization.

2. The method of claim 1 further comprises: repeating the steps of monitoring system resource utilization and selecting another operational policy from the plurality of predefined policies until the system resource utilization does not exceed the limit specified in the last selected policy.

3. The method of claim 2 further comprises: if the system resource utilization exceeds the limits specified in all predefined operational policies, creating in real-time a custom operational policy for the computer system, wherein the custom policy specifies different program settings that minimize system resource utilization by the computer program.

4. The method of claim 3, wherein rating performance of the computer system comprises: rating performance of a component of the computer system as a function of the component's performance characteristic and one or more technical characteristics.

5. The method of claim 4 further comprises: adjusting performance rating of the component of the computer system by a weighting coefficient to account for the relative costs of different components of the computer system, interoperability between different components of the computer system, or effect of an operating system on performance of different components.

6. The method of claim 5 further comprises: rating performance of the computer system by applying fuzzy logic rules to the adjusted performance ratings of system components.

7. The method of claim 6, wherein computer program settings include malware scan settings, wherein the scan settings include: day/time setting indicating start of malware scan, scan duration setting, hardware scan settings, and software scan settings.

8. A system for adaptive policy-based program configuration comprises:
   a memory configured to store
      a classification of computer systems having different performance characteristics;
      a plurality of predefined operational policies for a computer program, wherein each predefined operation policy specifies different program settings and different limits of system resource utilization by the program for each class of computer systems;
   a processor configured to
      collect from a computer system configuration and performance information for one or more computer system components;
      rate performance of the computer system based on the collected information;
      classify the computer system based on the system's performance rating;
      select based on the system's classification one of the plurality of predefined operational policies for the computer program to be executed on the computer system;
      monitor system resource utilization by the computer program being executed on the computer system to determine whether system resource utilization exceeds the limit specified in the selected operational policy; and
      if the system resource utilization exceeds the specified limit , select for the computer program another predefined operational policy specifying different program settings and a different limit of system resource utilization.

9. The system of claim 8, wherein the processor being further configured to repeat monitoring system resource utilization and selecting another operational policy from the plurality of predefined policies until the system resource utilization does not exceed the limit specified in the last selected policy.

10. The system of claim 9, wherein the processor being further configured to create in real-time a custom operational policy for the computer system if the system resource utilization exceeds the limits specified in all predefined operational policies, wherein the custom policy specifies different program settings that minimize system resource utilization by the computer program.

11. The system of claim 10, wherein to rate performance of the computer system the processor being further configured to rate performance of a component of the computer system as a function of the component's performance characteristic and one or more technical characteristics.

12. The system of claim 11, wherein the processor being further configured to adjust performance rating of the component of the computer system by a weighting coefficient to account for the relative costs of different components of the computer system, interoperability between different components of the computer system, or effect of an operating system on the performance of different components.

13. The system of claim 12, wherein the processor being further configured to rate performance of the computer system by applying fuzzy logic rules to the adjusted performance ratings of system components.

14. The system of claim 13, wherein computer program settings include malware scanning settings, wherein the scanning settings include: day/time setting indicating start of malware scanning, scan duration setting, hardware scan settings, and software scan settings.

15. A computer program product embedded in a non-transitory computer-readable storage medium, the computer-readable storage medium comprises computer-executable instructions for:
- collecting from a computer system configuration and performance information for one or more computer system components;
- rating performance of the computer system based on the collected information;
- classifying the computer system based on the system's performance rating, wherein different predefined classes of computer systems have different performance characteristics;
- selecting based on the system classification one of a plurality of predefined operational policies for a computer program to be executed on the computer system, wherein each predefined operational policy specifies different program settings and different limits of system resource utilization by the computer program for each class of computer systems;
- monitoring system resource utilization by the computer program being executed on the computer system to determine whether system resource utilization exceeds the limit specified in the selected operational policy;
- if the system resource utilization exceeds the specified limit, selecting for the computer program another predefined operational policy specifying different program settings and a different limit of system resource utilization.

16. The medium of claim 15 further comprises instructions for
- repeating monitoring system resource utilization and selecting another operational policy from the plurality of predefined policies until the system resource utilization does not exceed the limit specified in the last selected policy; and
- if the system resource utilization exceeds the limits specified in all predefined operational policies, creating in real-time a custom operational policy for the computer system, wherein the custom policy specifies different program settings that minimize system resource utilization by the computer program.

17. The medium of claim 16, wherein instructions for rating performance of the computer system comprise instructions for rating performance of a component of the computer system as a function of the component's performance characteristic and one or more technical characteristics.

18. The medium of claim 17 further comprises instructions for adjusting performance rating of the component of the computer system by a weighting coefficient to account for the relative costs of different components of the computer system, interoperability between different components of the computer system, or effect of an operating system on the performance of different components.

19. The medium of claim 18 further comprises instructions for rating performance of the computer system by applying fuzzy logic rules to the adjusted performance ratings of system components.

20. The medium of claim 19, wherein computer program settings include malware scanning settings, wherein the scanning settings include: day/time setting indicating start of malware scanning, scan duration setting, hardware scan settings, and software scan settings.

* * * * *